United States Patent Office 3,110,479
Patented Nov. 12, 1963

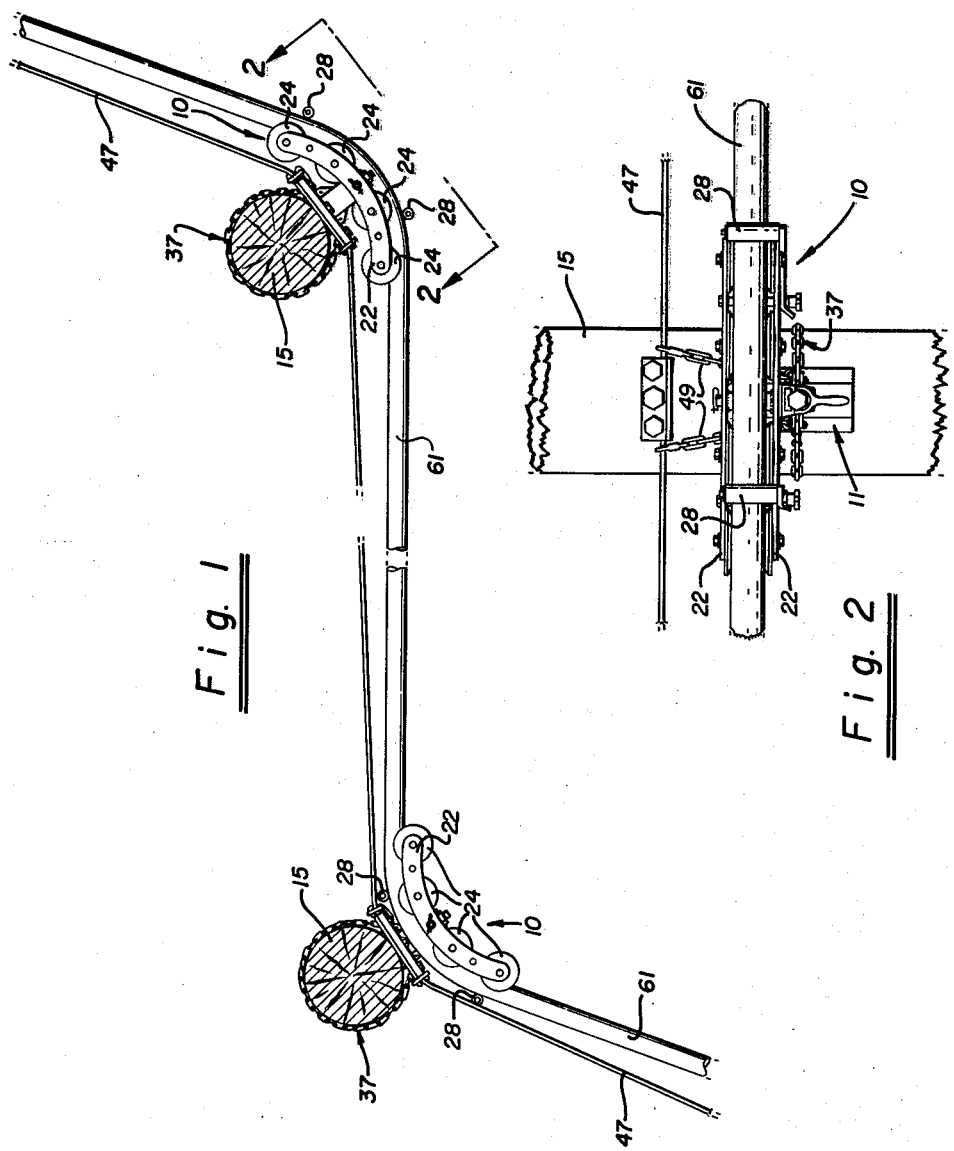

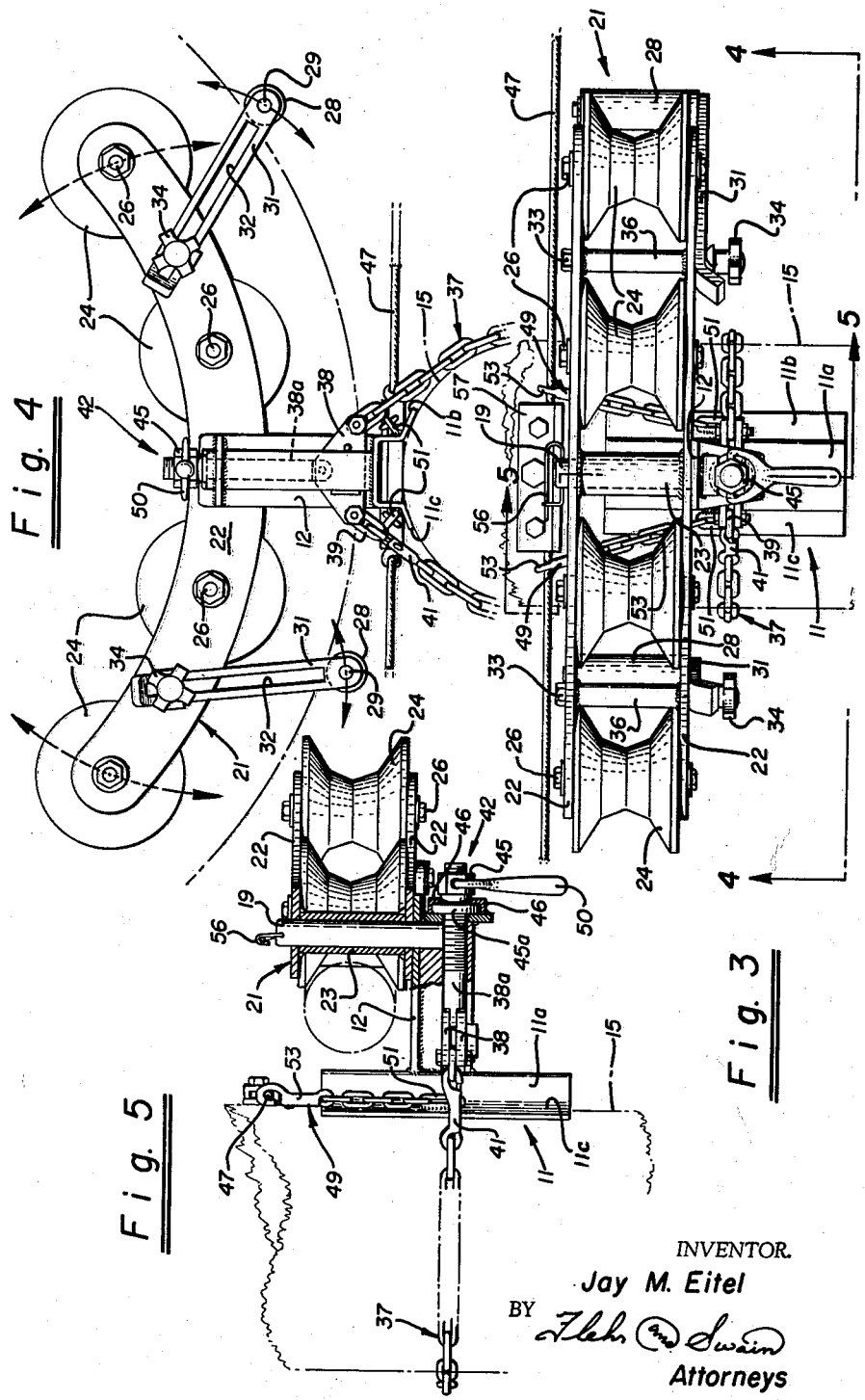

3,110,479
AROUND-THE-CORNER CABLE GUIDE
Jay M. Eitel, Los Altos, Calif., assignor to Telsta Corp., San Carlos, Calif., a corporation of California
Filed Jan. 15, 1962, Ser. No. 166,036
10 Claims. (Cl. 254—134.3)

This invention relates to an around-the-corner cable guide and more particularly to an around-the-corner cable guide for use in the placement of cables.

In the placement of cables such as telephone cables on a pole line, it is necessary to follow the pole line. Such pole lines very often do not follow a straight line but often follow a road and, therefore, curve as the road curves. There is a need for an around-the-corner cable guide which can be mounted on the poles to facilitate pulling of the cable around corners and for relatively great distances.

In general, it is an object of the present invention to provide an around-the-corner cable guide which will facilitate the placement of cable.

Another object of the invention is to provide a cable guide of the above character which can be utilized on either inside or outside corners.

Another object of the invention is to provide a cable guide of the above character which reduces friction to a minimum.

Another object of the invention is to provide a cable guide of the above character which can be readily mounted on the pole and spaced the desired distance below the messenger or strand carried by the pole.

Another object of the invention is to provide a cable guide of the above character which will follow the cable.

Another object of the invention is to provide a cable guide of the above character which can be readily and economically manufactured.

Additional objects and features of the invention will appear from the following description in which the preferred embodiment is set forth in detail in conjunction with the accompanying drawings.

Referring to the drawings:

FIGURE 1 is a plan view of a plurality of around-the-corner cable guides showing their use in stringing cable.

FIGURE 2 is a view looking along the line 2—2 of FIGURE 1.

FIGURE 3 is an enlarged detailed view of the around-the-corner cable guides.

FIGURE 4 is a view looking along the line 4—4 of FIGURE 3.

FIGURE 5 is a cross-sectional view taken along the line 5—5 of FIGURE 3.

In general, my around-the-corner cable guide is adapted to be mounted upon a pole and is used for guiding cable past the pole. It consists of a base with means adapted to secure the base to the pole. A swivel pin is mounted on the base and a framework is pivotally mounted on the swivel pin for swivelling movement about the pin. A plurality of rollers are rotatably mounted in the framework and define an arcuate path for the travel of the cable past the pole. Means is also provided to facilitate the spacing of the around-the-corner cable guide below the messenger or strand so that the cable will be properly positioned.

As shown in the drawing, my aound-the-corner cable guide 10 consists of a bracket or base 11 which can take any suitable form. For example, as shown in the drawing, it can consist of a U-shaped portion 11a and adjoining outwardly flared leg portions 11b and 11c as shown in FIGURE 4. The base 11 is adapted to fit against the pole 15 in a vertical position as shown. A horizontal support member 12 is affixed to the base 11 approximately midway between the top and the bottom of the base 11 and extends outwardly from the pole when the base is affixed to the pole. A vertical swivel pin 19 has its lower end affixed to the outer extremity of the support member 12 as shown particularly in FIGURE 5 and extends upwardly therefrom.

A framework 21 is pivotally mounted on the swivel pin 19 for swivelling movement about the pin 19. The framework 21 consists of a pair of vertically spaced parallel plates 22 which are arcuate in shape as shown and which are mounted on a sleeve or bearing 23 centrally disposed between the ends of the arcuate plates 22 and affixed thereto by suitable means such as welding. Holes are provided in the upper and lower arcuate plates 22 in registration with the sleeve 23 so that the framework 21 can be positioned on the pin 19 as shown in FIGURE 3 of the drawings.

A plurality of rollers 24 are rotatably mounted between the upper and lower plates 22 on vertical axes provided by the bolts 26 which extend through the plates 22 and through the rollers as shown. The rollers are also arranged so that they define an arcuate path for travel of the cable as hereinafter described.

A pair of retaining rollers 28 are rotatably mounted upon vertical pins 29 carried by rocker arms 31. The arms 31 are provided with slots 32 and are fastened to the lower plate member 22 by suitable means such as cap screws 33 on which are threaded hand knobs 34. The cap screws extend through sleeves 36 mounted between the frame members 22. It will be noted that one of the rollers 28 is mounted adjacent one end of the framework 21, whereas the other roller 28 is mounted adjacent the other end of the framework. From FIGURE 4, it can be seen that the position of the rollers 28 can be readily adjusted radially of the rollers 24 and also towards the rollers 24 depending upon the diameter of the cable which is being guided by the cable guide.

Suitable means is provided for clamping the around-the-corner assembly to the object supporting the messenger at the corner such as the pole 15 shown in the drawings. Although my cable guide is normally used with poles, it is also possible to fasten the same to trees and similar objects if it is desired to pass the cable around and past such objects. The means for securing the around-the-corner roller assembly to the pole consists of a chain 37 which has one end seccured to one corner of a tensioner plate 38 slidably mounted in the support member 12. As is shown in FIGURE 2, the chain 37 is adapted to be passed around the pole and secured to a ring 39 which is provided on another corner of the plate 38 by means of a snap 41 provided on the end of the chain. Suitable means is provided for tightening the chain 37 and consists of a tensioning assembly 42. The tensioning assembly includes the plate 38 which has an externally threaded cylindrical rod 38a pivotally mounted thereon. The rod is slidably mounted in a bore of horizontal member 12. A chain tensioning nut 45 is threaded onto the rod 38a as shown. The nut 45 is provided with a collar 45a which rides in a pair of grooves formed by brackets 46 provided on the support member 12. A handle 50 is pivotally mounted on the nut 45 and is used for turning the nut. To tighten or loosen the chain 37, it is only necessary to turn the nut 45.

Suitable means is also provided to facilitate the vertical positioning of the around-the-corner cable guide with respect to the messenger or strand 47 which is affixed to the pole. Such means can consist of a pair of chain assemblies 49. Each chain assembly consists of a length of chain 51 which has one end fixed to the base 11 by suitable means such as welding. The other end of each length of chain is provided with a snap 53 which is adapted to be snapped onto the messenger 47 as shown. The two chain assemblies thus support my guide as hereinafter described. A suitable safety lock such as a pin 56 can be provided on top of the pin 19 to ensure that the framework 21 will not jump off of the pin during the time it is guiding the cable.

Operation and use of my around-the-corner cable guide may now be briefly described as follows. Let it be assumed that it is desired to string a cable 61 along a pole line upon which the messenger 47 has already been mounted by the use of clamps 48. Now let it be assumed that the pole line is such that two sharp turns are encountered; the first, an outside turn as shown in FIGURE 1 in which the pole is on the outside of the angle formed by the messenger, and then an inside corner in which the pole is on the inside of the angle formed by the messenger. One of the around-the-corner cable guide assemblies is placed on the first pole 15 by first snapping the snaps 53 onto the messenger 47 on opposite sides of the clamp 57 securing the messenger 47 to the pole. The base 11 is then allowed to swing downwardly into engagement with the pole. The chain 37 is then passed around the pole and the snap 41 secured in the ring 39. The chain 37 is tightened by turning the nut 45. Thereafter, the frame 21 carrying the rollers 24 is mounted on the pin 19 in such a manner that a convex surface is presented by the rollers 24 to guide the cable. The cable 61 is then passed over and into the roller assembly 10 as shown in FIGURE 1 of the drawings and is strung between poles in a manner described in my copending application Serial No. 166,035, filed January 15, 1962.

When the next pole 15 is reached requiring the use of an around-the-corner cable guide such as shown in the right-hand side of FIGURE 2, the base 11 of the guide is affixed to the pole as hereinbefore described in such a manner that it is rigidly connected to the pole. The rigid connection to the pole is desirable because the around-the-corner cable guide must bear considerable stress during the time the cable is being pulled or towed. Thereafter, the framework 21 carrying the rollers 24 is mounted upon the pin 19 in such a manner that a convex surface is again presented to the cable 51 and a concave surface faces the pole. After this has been accomplished, the cable is passed over the rollers 24 and the cable is again placed adjacent the messenger by pulling the cable around the corners.

I have found that by the use of my around-the-corner roller assemblies, it is possible to pull relatively great lengths of cable without unduly stressing the cable. This is particularly true because the around-the-corner cable guides present very little friction and permit the cable to readily pass the poles.

The around-the-corner cable guides are constructed in such a manner that they will readily accommodate relatively sharp angles as, for example, angles from 0° to 70°–90°. When a small angle occurs, only two or three of the rollers may be engaged by the cable. On the sharper corners, all of the rollers will be engaged. The framework 21 will swivel about the pin 29 so that the cable guide is always automatically centered and serves to prevent damage to the cable.

From the foregoing description, it can be seen that my around-the-corner cable guides prevent the cable from dragging on the surface of the pole and thereby prevent damage to the cable. In addition, the cable guides greatly decrease friction so that it is not difficult to pull relatively large size cables over a long distance as, for example, 4000 ft.

The around-the-corner cable guides are provided with adequate safety devices. The base 11 is firmly secured to the pole so that it cannot slip from the pole. The framework 21 can be secured to the pin 19 by suitable safety means such as a cotter pin provided in the pin 19. In addition, the rollers 28 prevent the cable from dropping downwardly away from the cable guides and also prevent the cable from moving outwardly an undue amount from the rollers 24.

It is apparent from the foregoing that I have provided an around-the-corner cable guide which greatly facilitates the placement of cable. It is constructed of a suitable material such as cast aluminum so that it is light in weight and can be readily handled by a single operator.

I claim:

1. In an around-the-corner cable guide adapted to be mounted on a pole for guiding cable past the pole, a base, means mounted on the base and adapted to secure the base to the pole, a swivel pin fixed on the base, a framework pivotally mounted on said pin for swivelling movement about the pin, and a plurality of rollers rotatably mounted in said framework and defining an arcuate path for the travel of the cable around the pole.

2. A cable guide as in claim 1 wherein the framework can be mounted on the swivel pin so that either a concave arcuate surface or a convex arcuate surface can be faced towards the pole.

3. A cable guide as in claim 1 wherein said pin is a vertical pin and wherein said framework is mounted in a substantially horizontal position.

4. A cable guide as in claim 3 together with safety rollers mounted on said framework forming with the framework a space open from the top side to facilitate easy insertion of the cable, said safety rollers serving to prevent the cable from dropping away from the rollers rotatably mounted in the framework.

5. In an around-the-corner cable guide of the type adapted to be mounted on a pole for the guiding of cable past the pole and positioning it a predetermined distance below the messenger mounted on the pole, a base, means mounted on the base adapted to releasably secure the base to the pole, a vertical swivel pin mounted on the base, a horizontal framework pivotally mounted on said pin for swivelling movement about the pin, said horizontal framework comprising a pair of vertically spaced parallel arcuate plates, bearing means mounted between the plates and adapted to be seated upon the pin, and a plurality of rollers rotatably mounted in the framework between the spaced parallel plates and defining an arcuate path for the travel of the cable past the pole.

6. A cable guide as in claim 5 together with means carried by the base and adapted to be secured to the messenger to properly position the cable guide below the messenger.

7. A cable guide as in claim 5 together with a pair of spaced safety rollers mounted on said framework and forming with the framework spaces open from the top side facilitating easy insertion of the cable, said safety rollers serving to prevent the cable as it is guided by the rollers from falling away from the rollers in the framework.

8. A cable guide as in claim 5 together with a pair of arms mounted on said lower plate of the framework, a vertical safety roller rotatably mounted on each of the arms and spaced away from the rollers in the framework to form spaces open from the top sides to facilitate placement of cable between the safety rollers and the rollers in the framework, said safety rollers serving to prevent the cable from falling away from the rollers in the framework.

9. A roller assembly as in claim 5 wherein said framework is formed so that it may be mounted on said pin so that the rollers present either a concave cable path facing the pole or a convex cable path facing the pole.

10. A roller assembly as in claim 5 wherein said means adapted to secure the base to the pole consists of a chain having one end affixed to the base and having the other end of the chain being releasably engaged by the base, and means for tightening the chain.

References Cited in the file of this patent

UNITED STATES PATENTS

| | | |
|---|---|---|
| 2,571,246 | Hubbard | Oct. 16, 1951 |
| 2,946,559 | Pickett | July 26, 1960 |
| 3,042,374 | Livingston | July 3, 1962 |

FOREIGN PATENTS

| | | |
|---|---|---|
| 1,104,834 | France | Nov. 24, 1955 |